United States Patent
Kawasaki et al.

(10) Patent No.: US 8,680,737 B2
(45) Date of Patent: Mar. 25, 2014

(54) MOTOR AND ELECTRONIC APPARATUS USING THE SAME

(75) Inventors: Hiroaki Kawasaki, Osaka (JP); Yuichi Yoshikawa, Osaka (JP); Atsuyoshi Koshiba, Hyogo (JP); Koji Kadowaki, Tottori (JP); Yasuo Kunishige, Tottori (JP); Yasuhiro Inoue, Tottori (JP)

(73) Assignee: Panasonic Corporation, Osaka (JP)

( * ) Notice: Subject to any disclaimer, the term of this patent is extended or adjusted under 35 U.S.C. 154(b) by 380 days.

(21) Appl. No.: 12/827,405

(22) Filed: Jun. 30, 2010

(65) Prior Publication Data
US 2011/0006620 A1    Jan. 13, 2011

(30) Foreign Application Priority Data

Jul. 7, 2009  (JP) .................................. 2009-160942

(51) Int. Cl.
*H02K 1/14* (2006.01)

(52) U.S. Cl.
USPC ............................ 310/216.064; 310/216.097

(58) Field of Classification Search
USPC .................... 310/216.113, 216.064, 216.057, 310/216.091–216.098, 216.111, 216.112
IPC ................................................. H02K 1/14,1/08
See application file for complete search history.

(56) References Cited

U.S. PATENT DOCUMENTS

| | | |
|---|---|---|
| 3,123,747 A | 3/1964 | Glass |
| 4,545,827 A | 10/1985 | Rastogi |
| 4,575,652 A | 3/1986 | Gogue |
| 4,902,941 A | 2/1990 | Merkle et al. |
| 5,047,682 A | 9/1991 | Burgbacher |
| 5,604,389 A | 2/1997 | Nitta |
| 6,628,028 B2 | 9/2003 | Yoshida et al. |
| 6,628,034 B2 | 9/2003 | Jang et al. |

(Continued)

FOREIGN PATENT DOCUMENTS

| | | |
|---|---|---|
| JP | 53-125002 | 10/1978 |
| JP | 2-133042 | 5/1990 |

(Continued)

OTHER PUBLICATIONS

Machine Translation, JP 2007-097276, Iron Core of Rotating Electric Machine and Iron Core of Linear Motor, Apr. 12, 2007.*

*Primary Examiner* — John K Kim
*Assistant Examiner* — Thomas Truong
(74) *Attorney, Agent, or Firm* — Hamre, Schumann, Mueller & Larson, P.C.

(57) ABSTRACT

A stator 3 is provided with a plurality of magnetic poles 3a on the outer circumference thereof, and is configured from a plurality of layers of plate-shaped members. A rotor 4 is rotatably disposed around the stator. The inner circumferential face of the rotor is provided with a magnet 5. The outer circumferential ends of the magnetic poles of the stator are provided with an extended portion that is bent such that at least one plate-shaped member, including an outermost layer, of the plurality of plate-shaped members is substantially parallel to the magnet. When the inner diameter of a bent portion of a plate-shaped member that is the closest to the magnet of the at least one plate-shaped member constituting the extended portion is taken as R1$i$, and the thickness of the closest plate-shaped member is taken as T1, R1$i$<T1 is satisfied. Accordingly, it is possible to improve the driving efficiency of an outer rotor-type motor.

5 Claims, 5 Drawing Sheets

(56) References Cited

U.S. PATENT DOCUMENTS

| | | |
|---|---|---|
| 7,268,450 B2 | 9/2007 | Takeuchi |
| 7,327,066 B2 | 2/2008 | Gomyo et al. |
| 7,420,309 B2 * | 9/2008 | Wakitani et al. ....... 310/216.048 |
| 7,456,540 B2 | 11/2008 | Gomyo et al. |
| RE43,055 E | 1/2012 | Takeuchi |
| 2003/0090168 A1 | 5/2003 | Takano et al. |
| 2006/0066172 A1 | 3/2006 | Takeuchi |
| 2006/0197402 A1 | 9/2006 | Gomyo et al. |
| 2007/0013255 A1 | 1/2007 | Wakitani et al. |
| 2007/0267927 A1 | 11/2007 | Chen |
| 2008/0106167 A1 | 5/2008 | Gomyo et al. |
| 2010/0237752 A1 | 9/2010 | Yoshikawa et al. |
| 2010/0259126 A1 * | 10/2010 | Yoshikawa et al. .... 310/216.064 |

FOREIGN PATENT DOCUMENTS

| | | |
|---|---|---|
| JP | 6-296353 | 10/1994 |
| JP | 9-285044 | 10/1997 |
| JP | 2002-250888 | 9/2002 |
| JP | 2006-014548 | 1/2006 |
| JP | 2006-067697 | 3/2006 |
| JP | 2006-129688 | 5/2006 |
| JP | 2006-166637 | 6/2006 |
| JP | 2007097276 A * | 4/2007 |
| JP | 2007-244004 | 9/2007 |
| JP | 2009-095131 | 4/2009 |
| WO | WO 2009063617 A1 * | 5/2009 |

\* cited by examiner

- Prior Art -

MOTOR AND ELECTRONIC APPARATUS USING THE SAME

BACKGROUND OF THE INVENTION

1. Field of the Invention

The present invention relates to a motor and an electronic apparatus using the same.

2. Description of the Related Art

In electronic apparatuses such as laser printers, a paper feed roller (driven member) provided in a main body case is coupled via a deceleration mechanism to a driving shaft of a motor. When this motor is driven, the paper feed roller rotates and feeds paper to a predetermined portion.

As this motor, a brushless DC motor that ordinarily is used includes: a stator on whose outer circumference a plurality of magnetic poles are arranged at a first predetermined interval; and a rotor that is rotatably disposed around the stator. An inner circumferential face of the rotor is provided with a magnet magnetized to have opposite polarities at a second predetermined interval.

In this sort of motor, ordinarily, in order to arrange the magnet of the rotor as close as possible to a magnetism-detecting element that magnetically detects rotation of the rotor, the size of the magnet in a direction parallel to a motor-driving shaft is set larger than the size of a magnetic pole base of the stator in the same direction. In this case, an extended portion that extends in a direction substantially parallel to the magnet often is formed on both sides of a magnetic pole base, at outer circumferential ends of the magnetic poles of the stator (see JP H9-285044A and JP 2007-244004A, for example). Accordingly, the area in which the magnet of the rotor and the magnetic poles of the stator oppose each other increases, and, thus, the driving force and the driving efficiency of the motor can be increased.

The extended portion has an effect of causing magnetic fluxes from the magnet to flow thereinto, and, thus, more magnetic fluxes from the magnet can be directed to the magnetic poles of the stator in the case where the extended portion is provided than in the case where no extended portion is provided. Accordingly it is considered that the driving force and the driving efficiency can be increased by forming an extended portion at outer circumferential ends of the magnetic poles of the stator.

However, according to investigations of the present inventors, the driving force cannot be necessarily increased simply by providing an extended portion.

The extended portion ordinarily is formed by bending plate-shaped members constituting the stator so as to be substantially parallel to the magnet. In the case where, in a plate-shaped member that is the closest to the magnet among the plate-shaped members constituting the extended portion, the diameter (hereinafter; referred to as an "outer diameter") of a face (outer face) of the bent portion opposing the magnet is large, the distance between the bent portion and the magnet increases, and, thus, the effect of causing magnetic fluxes from the magnet to flow into the bent portion is lowered. As a result, the driving force and the driving efficiency cannot be improved as expected.

Furthermore, magnetic fluxes from the magnet flowing into the extended portion pass through the bent portion of the plate-shaped member. However; due to a processing strain that occurs during the bending processing of the plate-shaped member; a magnetic properties-deteriorated region is formed in the bent portion. In this magnetic properties-deteriorated region, magnetic saturation easily occurs. When magnetic saturation occurs, iron loss increases. As a result, the driving force and the driving efficiency cannot be improved.

SUMMARY OF THE INVENTION

It is an object of the present invention to solve the above-described problem, by improving the driving efficiency of a motor.

The present invention is directed to a motor, including: a stator on whose outer circumference a plurality of magnetic poles are arranged at a first predetermined interval in a circumferential direction; and a rotor that is rotatably disposed around the stator. An inner circumferential face of the rotor is provided with a magnet magnetized to have opposite polarities at a second predetermined interval in a circumferential direction. The stator is configured from a plurality of layers of plate-shaped members. Each of outer circumferential ends of the plurality of magnetic poles is provided with an extended portion that is bent such that at least one plate-shaped member, including an outermost layer, of the plurality of plate-shaped members is substantially parallel to the magnet. Then, when an inner diameter of a bent portion of a plate-shaped member that is the closest to the magnet of the at least one plate-shaped member constituting the extended portion is taken as R1$i$, and a thickness of the closest plate-shaped member is taken as T1, R1$i$<T1 is satisfied.

The present invention is directed to an electronic apparatus, comprising: a main body case; a driven member that is provided in the main body case; and a motor that is coupled to the driven member; wherein the motor is the motor according to the present invention.

DESCRIPTION OF THE PREFERRED EMBODIMENTS

According to the present invention, an inner diameter R1$i$ of a bent portion of a plate-shaped member that is the closest to the magnet of at least one plate-shaped member constituting the extended portion is smaller than a thickness T1 of the plate-shaped member, and, thus, an outer diameter of the bent portion of this plate-shaped member is also reduced. Accordingly, the area of a region of the extended portion effective for causing magnetic fluxes from the magnet to flow thereinto increases, and the amount of magnetic fluxes flowing from the magnet into the extended portion increases. As a result, the driving efficiency of the motor can be improved.

Furthermore, since the inner diameter R1$i$ of the bent portion of the plate-shaped member that is the closest to the magnet of the at least one plate-shaped member constituting the extended portion is smaller than the thickness T1 of the plate-shaped member, magnetic properties-deteriorated regions formed by a processing strain that occurs at the bent portion during the bending processing of the plate-shaped member can be reduced. Accordingly, even when the amount of magnetic fluxes passing through the bent portion is increased by providing the extended portion, occurrence of magnetic saturation in the bent portion can be suppressed, and an increase in the iron loss can be reduced. As a result, the driving efficiency of the motor can be improved.

As described above, according to the present invention, the amount of magnetic fluxes flowing from the magnet into the extended portion can be increased. Furthermore, even when the amount of magnetic fluxes passing through the bent portion is increased by an increase in the amount of magnetic fluxes flowing into the extended portion, magnetic saturation does not occur at the bent portion, and the magnetic fluxes can be guided to a magnetic path (a portion of the magnetic pole of the stator about which a coil is wound). Accordingly, the driving efficiency of the motor can be improved.

Hereinafter, the present invention will be described in detail using a preferred embodiment. Here, it will be appreciated that the present invention is not limited to the following embodiment.

Figure 1:
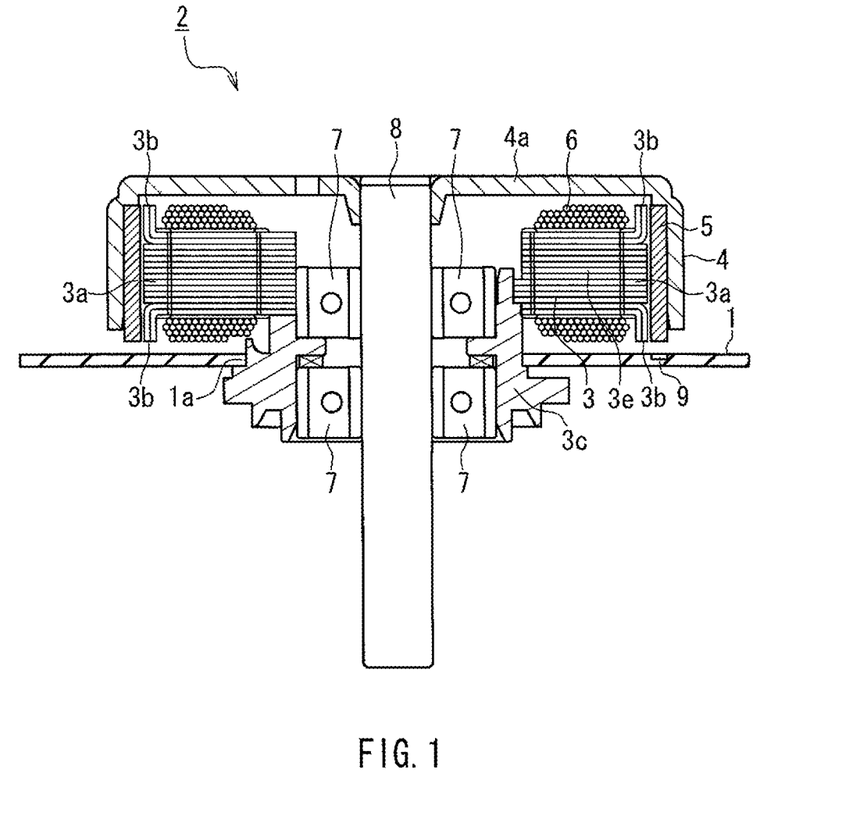
FIG. 1 is a cross-sectional view showing the schematic configuration of a motor according to an embodiment of the present invention.

FIG. 1 is a cross-sectional view showing the schematic configuration of a motor 2 according to an embodiment of the present invention. As shown in FIG. 1, the motor 2 of this embodiment is mounted on a wiring board (substrate) 1 of an electronic apparatus (e.g., a laser printer). The wiring board 1 is provided horizontally in a main body case (not shown) constituting the electronic apparatus.

In the description below, the direction of a driving shaft 8 of the motor 2 is taken as a vertical direction, and the upper side and the lower side in the section of the diagram of FIG. 1 are referred to respectively as an "upper side" and a "lower side" of the motor 2.

The motor 2 includes a stator 3 that is mounted via a holding portion 3$c$ on the wiring board 1, and a rotor 4 that is disposed around the stator 3. The rotor 4 is in the shape of a cylinder; the upper end thereof has a top plate 4$a$ fixed thereto, and the lower end thereof is open. The inner circumferential face of the holding portion 3$c$ is provided with a plurality of bearings 7. The driving shaft 8 of the motor 2 passes through the plurality of bearings 7, and the upper end of the driving shaft 8 is fixed to the top plate 4$a$ of the rotor 4. As a result, the rotor 4 and the driving shaft 8 are freely rotatable with respect to the stator 3 via the bearings 7. The lower end of the driving shaft 8 passes through a through-hole 1$a$ of the wiring board 1, and extends downward from the wiring board 1.

A magnet 5 in the shape of a ring is fixed to the inner circumferential face of the rotor 4. A face of the magnet 5 opposing the stator 3 is magnetized (main magnetization) such that an N-pole and an S-pole are formed alternately (such that adjacent poles have opposite polarities) at a predetermined interval in the circumferential direction. The direction of the main magnetization is in a direction opposing the stator 3 (radial direction).

Figure 2:
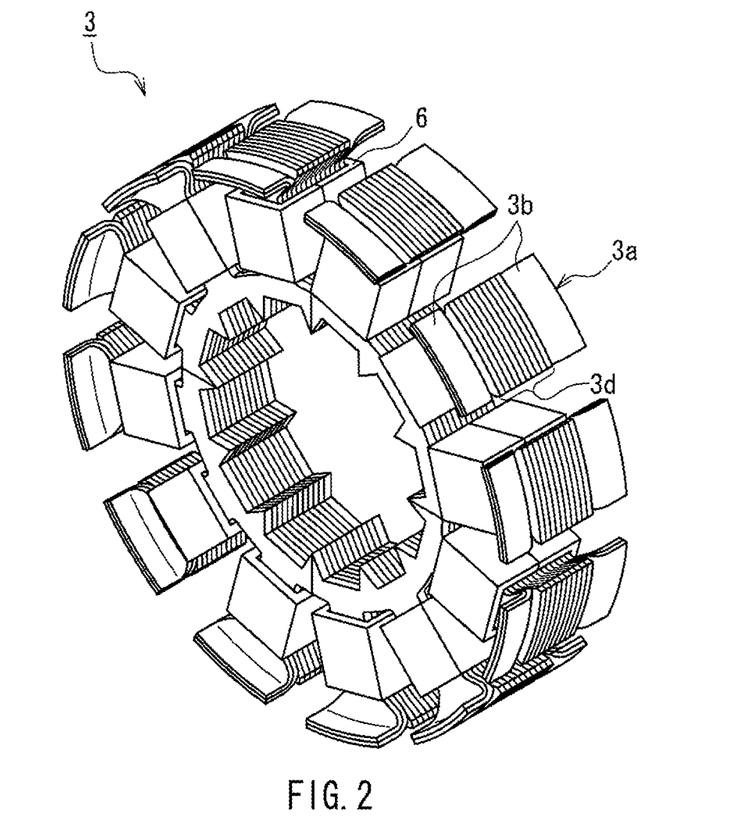
FIG. 2 is a perspective view showing the schematic configuration of a stator constituting the motor according to the embodiment of the present invention.
Figure 3:
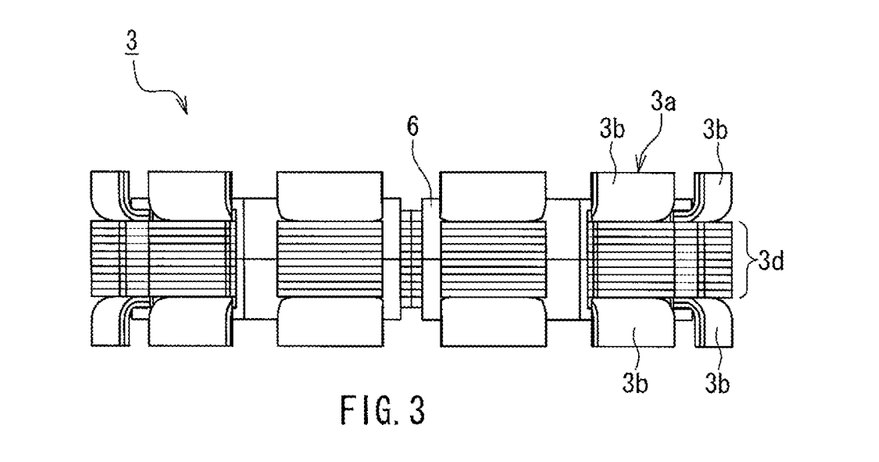
FIG. 3 is a front view showing the schematic configuration of the stator constituting the motor according to the embodiment of the present invention.

FIG. 2 is a perspective view of the stator 3. FIG. 3 is a front view of the stator 3. The stator 3 includes a layered member in which a plurality of plate-shaped members (e.g., thin steel plates having a high magnetic permeability) are layered. A plurality of magnetic poles 3$a$ are arranged at a predetermined interval in the circumferential direction on the outer circumference of the stator 3 (see FIG. 2). A coil 6 for an electromagnet is wound about a magnetic path 3$e$ (see FIG. 1) that is a portion where a magnetic circuit is formed on the inner side of each magnetic pole 3$a$. When an AC power is applied to the coil 6, each magnetic pole 3$a$ is magnetized to have an N-polarity and an S-polarity alternately. Accordingly, attraction or repulsion is generated between the magnetic pole 3$a$ and the magnet 5 opposing each other, the rotor 4 rotates about the driving shaft 8, and a rotational driving force is output via the driving shaft 8.

Returning to FIG. 1, a Hall IC 9 is mounted as a magnetism-detecting element at a position on the wiring board 1 opposing the lower end face of the magnet 5. The Hall IC 9 may be provided on either an upper face (face opposing the magnet 5) or a lower face of the wiring board 1. With a well known method, the Hall IC 9 is used to detect the rotational speed and the rotational amount of the rotor 4, thereby controlling the rotations.

In order to arrange the magnet 5 as close as possible to the Hall IC 9, the lower end of the magnet 5 (end portion on the wiring board 1 side) is extended downward to near the Hall IC 9. Furthermore, in order to avoid deterioration of balance with the stator 3 caused because the lower end of the magnet 5 is extended downward, the upper end of the magnet 5 also is extended upward by the same amount.

As a result, the vertical size of the magnet 5 increases. In accordance with this increase, the outer circumferential end of each magnetic pole 3$a$ of the stator 3 is provided with extended portions 3$b$ that respectively extend from a central magnetic pole base 3$d$ to the wiring board 1 side (lower side) and to the top plate 4$a$ side (upper side). The extended portions 3$b$ are substantially parallel to the magnet 5, that is, substantially parallel to the axial direction of the driving shaft 8. In the case where the extended portions 3$b$ are provided, the area of the magnetic poles 3$a$ opposing the magnet 5 increases, and, thus, the amount of magnetic fluxes flowing from the magnet 5 into the magnetic poles increases, and a large driving force can be given to the rotor 4.

The extended portions 3$b$ are formed by bending an outer circumferential portion of at least one plate-shaped member (two plate-shaped members in this embodiment), including the outermost layer (the uppermost layer or the lowermost layer), of a plurality of layers of plate-shaped members constituting the stator 3 upward or downward at a substantially right angle so as to be substantially parallel to the magnet 5.

In the present invention, when the inner diameter of the bent portion of a plate-shaped member that is the closest to the magnet 5 among the plate-shaped members constituting the extended portion 3$b$ is taken as R1$i$, and the thickness of the plate-shaped member is taken as T1, R1$i$<T1 is satisfied. Here, the inner diameter R1$i$ of the bent portion refers to a diameter of a face (inner face) of the bent portion on a side opposite the side opposing the magnet. The effect obtained by this configuration will be described below.

Figure 4:
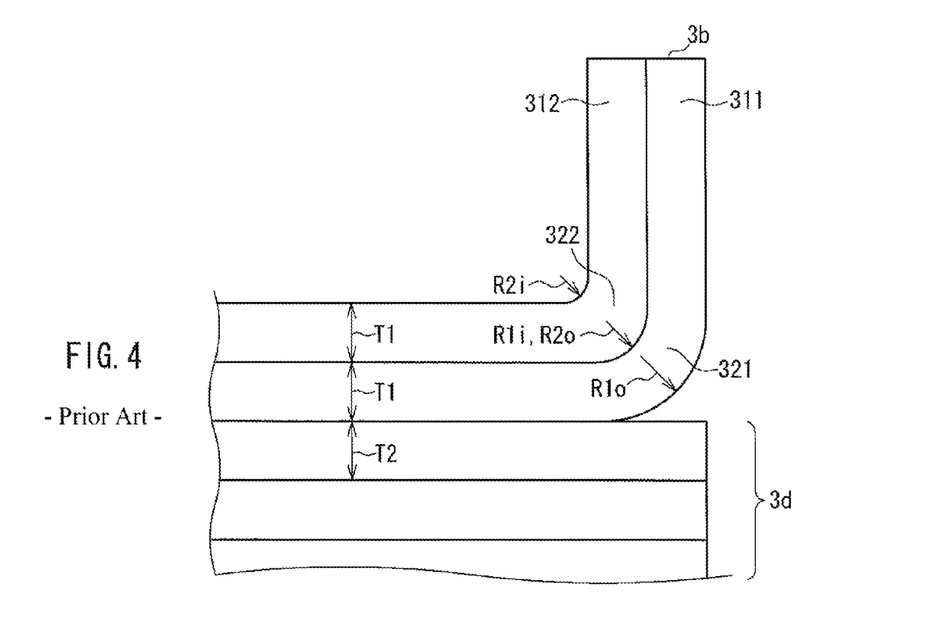
FIG. 4 is an enlarged side view showing an extended portion of a stator and a portion therearound in a conventional motor.

FIG. 4 is a view showing the extended portion 3$b$ and the vicinity thereof in a conventional motor. In FIG. 4, the extended portion 3$b$ is formed by bending two plate-shaped members 311 and 312, including the outermost layer; of the plurality of plate-shaped members constituting the stator 3. The plate-shaped members 311 and 312 constituting the extended portion 3b have the same thickness T1. All of plate-shaped members not constituting the extended portion (i.e., plate-shaped members constituting the magnetic pole base 3d) have the same thickness T2. In conventional examples, ordinarily, the extended portion 3b is formed by simultaneously bending the two plate-shaped members 311 and 312. With this bending method, the inner diameter R1i of a bent portion 321 of the plate-shaped member 311 that is the closest to the magnet 5 among the plate-shaped members 311 and 312 constituting the extended portion 3b is the same as an outer diameter R2o of a bent portion 322 of the plate-shaped member 312 adjacent to the plate-shaped member 311. The outer diameter R2o of the bent portion 322 of the plate-shaped member 312 is determined by an inner diameter R2i of the bent portion 322, and is larger than the inner diameter R2i. Accordingly it is difficult to bend the plate-shaped members 311 and 312 such that the inner diameter R1i of the bent portion 321 of the plate-shaped member 311 having the thickness T1 satisfies R1i<T1. Furthermore, an outer diameter R1o of the bent portion 321 of the plate-shaped member 311 inevitably increases.

Figure 5:
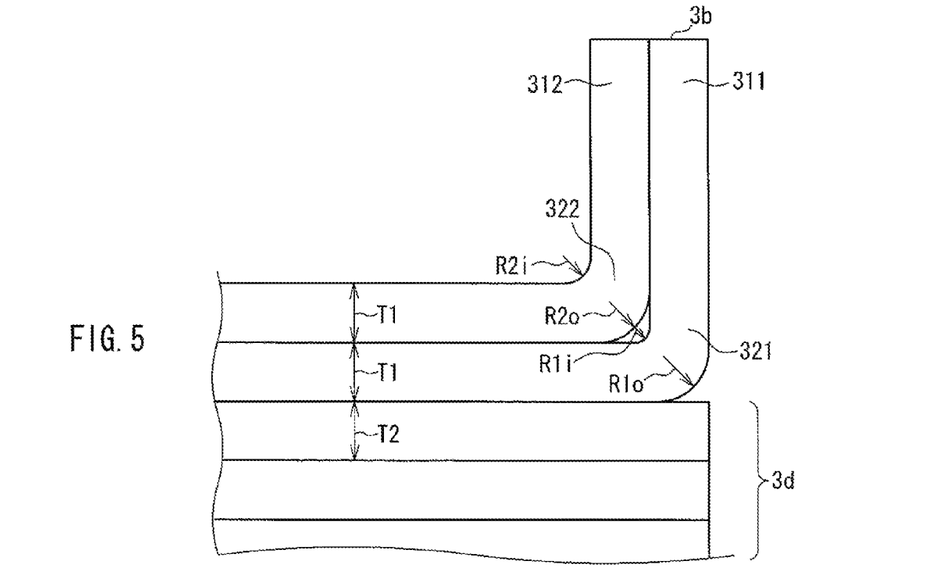
FIG. 5 is an enlarged side view showing an extended portion of a stator and a portion therearound in a motor according to the embodiment of the present invention.

FIG. 5 is a view showing the extended portion 3b and the vicinity thereof in the motor of this embodiment. Also in FIG. 5, the extended portion 3b is formed by bending the two plate-shaped members 311 and 312, including the outermost layer, of the plurality of plate-shaped members constituting the stator 3 as in FIG. 4. The plate-shaped members 311 and 312 constituting the extended portion 3b have the same thickness T1. All of plate-shaped members not constituting the extended portion (i.e., plate-shaped members constituting the magnetic pole base 3d) have the same thickness T2. The inner diameter of the bent portion 321 of the plate-shaped member 311 that is the closest to the magnet 5 (see FIG. 1) among the plate-shaped members 311 and 312 constituting the extended portion 3b is taken as R1i, and the outer diameter of the bent portion is taken as R1o. The inner diameter of the bent portion 322 of the plate-shaped member 312 adjacent to the plate-shaped member 311 is taken as R2i, and the outer diameter of the bent portion is taken as R2o. In the present invention, the plate-shaped member 311 that is the closest to the magnet 5 among the plate-shaped members 311 and 312 constituting the extended portion 3b satisfies R1i<T1. This configuration can be easily realized, for example, by bending the plate-shaped member 311 separately from the plate-shaped member 312.

Since the plate-shaped member 311 satisfies R1i<T1, the outer diameter R1o of the bent portion 321 of the plate-shaped member 311 can be reduced. In a region where the extended portion 3b opposes the magnet 5, a region excluding the bent portion 321 has a smaller gap to the magnet 5 than the bent portion 321 has, and thus has a larger effect of causing magnetic fluxes from the magnet 5 to flow thereinto. In the present invention, the outer diameter R1o of the bent portion 321 can be reduced. Thus, in a region of the extended portion 3b opposing the magnet 5, the area of a region excluding the bent portion 321 (effective opposing region), which is a region effective for causing magnetic fluxes from the magnet 5 to flow thereinto, increases. Accordingly, the amount of magnetic fluxes flowing from the magnet 5 to the extended portion 3b increases. As a result, the driving efficiency of the motor can be improved.

Furthermore, since R1i<T1 is satisfied, a deformed region of the plate-shaped member 311 (i.e., the bent portion 321) is reduced, and thus, magnetic properties-deteriorated regions can be reduced. The magnetic properties-deteriorated regions are regions in which magnetic properties deteriorate due to a processing strain that is caused by the bending processing of the plate-shaped member. In the case where a magnetic properties-deteriorated region formed in the plate-shaped member increases in size, magnetic saturation easily occurs at the magnetic properties-deteriorated region. In the case where magnetic saturation occurs, even when electrical power applied to the coil 6 is increased, the rotational torque of the rotor 4 does not increase proportionally, and the driving efficiency deteriorates.

Figure 6:
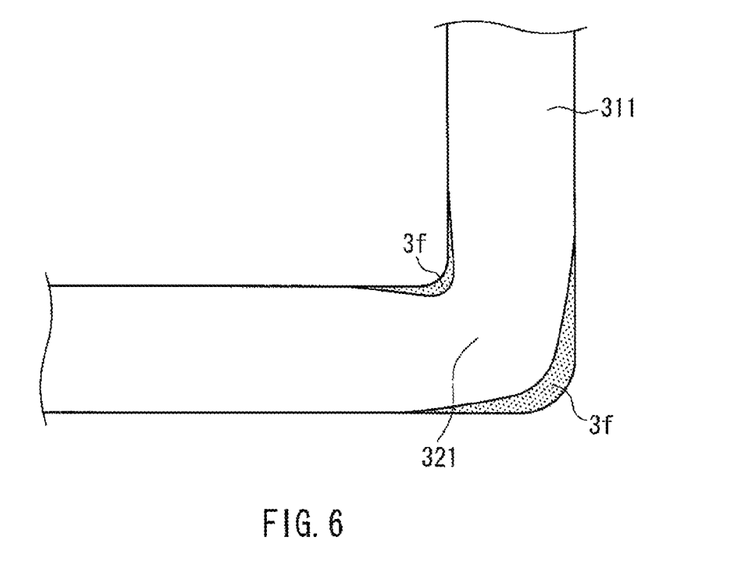
FIG. 6 is a view showing magnetic properties-deteriorated regions formed in a bent portion of a plate-shaped member that is the closest to a magnet among plate-shaped members constituting the extended portion in the motor according to the embodiment of the present invention.
Figure 7:
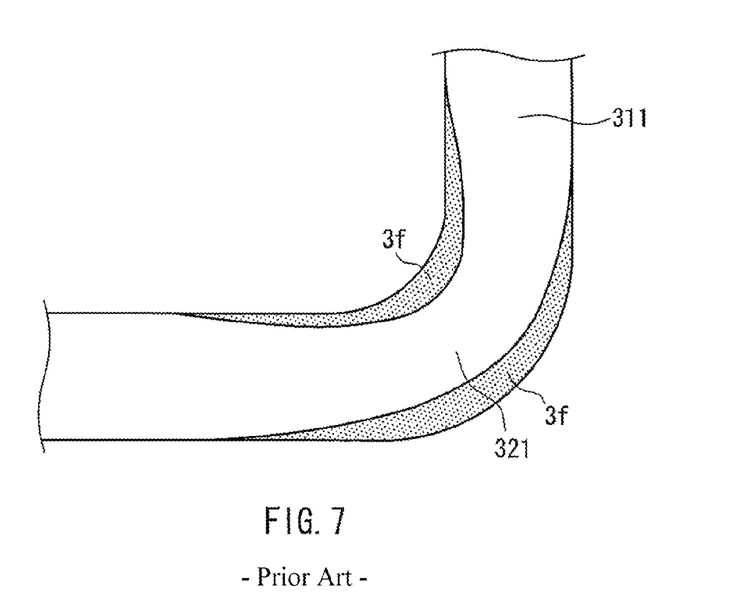
FIG. 7 is a view showing magnetic properties-deteriorated regions formed in a bent portion of a plate-shaped member that is the closest to a magnet among plate-shaped members constituting the extended portion in the conventional motor.

FIG. 6 is a view showing magnetic properties-deteriorated regions 3f formed in the bent portion 321 of the plate-shaped member 311 in the motor of this embodiment shown in FIG. 5. FIG. 7 is a view showing the magnetic properties-deteriorated regions 3f formed in the bent portion 321 of the plate-shaped member 311 in the conventional motor shown in FIG. 4. In both of FIGS. 6 and 7, the magnetic properties-deteriorated regions 3f are formed at the surfaces of the bent portion 321 on the inner circumferential side and the outer circumferential side. Here, in this embodiment shown in FIG. 6, the plate-shaped member 311 is bent such that the inner diameter R1i of the bent portion 321 is smaller than the thickness T1 of the plate-shaped member 311. Thus, the magnetic properties-deteriorated regions 3f in this embodiment shown in FIG. 6 are smaller than the magnetic properties-deteriorated regions 3f in the conventional example shown in FIG. 7. Accordingly, even when the amount of magnetic fluxes passing through the bent portion 321 is increased by providing the extended portion 3b, occurrence of magnetic saturation in the bent portion 321 can be suppressed, and an increase in the iron loss can be reduced. As a result, the driving efficiency of the motor can be improved.

It is preferable that the outer diameter R1o of the bent portion 321 of the plate-shaped member 311 that is the closest to the magnet 5 of at least one plate-shaped member constituting the extended portion 3b satisfies R1o<T1. Accordingly, in a region of the extended portion 3b opposing the magnet 5, the area of a region excluding the bent portion 321 (effective opposing region) increases, and, thus, the amount of magnetic fluxes flowing from the magnet 5 to the extended portion 3b increases. Furthermore, magnetic properties-deteriorated regions formed in the bent portion 321 can be reduced in size, and, thus, the occurrence of magnetic saturation in the bent portion 321 can be suppressed. Accordingly, the driving efficiency of the motor can be improved further.

In the description above, the inner diameter RE of the bent portion 321 of the plate-shaped member 311 that is the closest to the magnet 5 of at least one plate-shaped member constituting the extended portion 3b is made smaller than the thickness T1 of the plate-shaped member 311, but it is preferable that the extended portion 3b is configured from at least two plate-shaped members, and that the inner diameter of the bent portion of each of the at least two plate-shaped members is smaller than the thickness of the plate-shaped member. For example, in the case where the extended portion 3b is configured from the two plate-shaped members 311 and 312 as shown in FIG. 5, it is preferable not only that the plate-shaped member 311 satisfies R1i<T1, but also that the plate-shaped member 312 adjacent to the plate-shaped member 311 satisfies R2i<T1. Accordingly magnetic properties-deteriorated regions formed in the bent portions 321 and 322 of the plate-shaped members 311 and 312 constituting the extended portion 3b can be reduced, and, thus, occurrence of magnetic saturation in the bent portions 321 and 322 can be suppressed, and an increase in the iron loss can be reduced. As a result, the driving efficiency of the motor can be improved further.

It is preferable that the thickness T1 of the plate-shaped member 311 that is the closest to the magnet 5 of at least one plate-shaped member constituting the extended portion 3b and the thickness T2 of plate-shaped members not constituting the extended portion 3b (i.e., plate-shaped members constituting the magnetic pole base 3d) satisfy T1>T2. In the case where the thickness T1 of the plate-shaped member 311 constituting the extended portion 3b is increased in this manner, the cross-sectional area of a region where magnetic properties do not deteriorate can be increased in the bent portion 321 of the plate-shaped member 311. In the case where the extended portion 3b is formed, a large amount of magnetic fluxes flow into the plate-shaped member 311 constituting the extended portion 3b, and proceed via the bent portion 321 to the magnetic path 3e (see FIG. 1). In the case where the thickness of the plate-shaped member 311 is relatively increased such that T1>T2 is satisfied, a larger region where magnetic properties do not deteriorate can be secured in the bent portion 321. Thus, even when a large amount of magnetic fluxes flow into the plate-shaped member 311 constituting the extended portion 3b, occurrence of magnetic saturation in the bent portion 321 can be suppressed, and an increase in the iron loss can be reduced. As a result, the driving efficiency can be improved further.

In the case where the thicknesses of plate-shaped members not constituting the extended portion 3b (i.e., plate-shaped members constituting the magnetic pole base 3d) are not the same, it is preferable that, when the thickness of the thinnest plate-shaped member among the plate-shaped members not constituting the extended portion 3b is taken as T2, T1>T2 is satisfied. The reason for this is that, since magnetic saturation more easily occurs as the plate-shaped member is thinner, it is reasonable to focus on the thinnest plate-shaped member.

In the foregoing embodiment, the case is described in which the extended portion 3b is configured from the two plate-shaped members 311 and 312, but the present invention is not limited to this. The extended portion 3b may be configured from one plate-shaped member, or may be configured from three or more plate-shaped members.

Furthermore, in the foregoing embodiment, the case is described in which, when the extended portion 3b is configured from a plurality of plate-shaped members, the plurality of plate-shaped members have the same thickness T1, but the present invention is not limited to this. The thickness of at least one of the plurality of plate-shaped members constituting the extended portion 3b may be different from that of the other plate-shaped members.

An experiment was performed in order to confirm the effect of the present invention.

The experimental method was as follows. Extended portions were formed by bending the uppermost plate-shaped member and the lowermost plate-shaped member among a plurality of plate-shaped members constituting a stator upward and downward so as to be substantially parallel to a magnet. The thickness of plate-shaped members constituting the extended portions was T1=0.7 mm, and the inner diameter of the bent portions of the plate-shaped members was $R1i$=0.5 mm. A motor having the same configuration as in the motor shown in FIGS. 1 to 3 except that the extended portions 3b were configured from one plate-shaped member was produced (product of the present invention).

For the sake of comparison, a motor was produced as in the product of the present invention except that the inner diameter of the bent portions of the plate-shaped members constituting the extended portions was changed to $R1i$=2.5 mm (conventional product).

Figure 8:
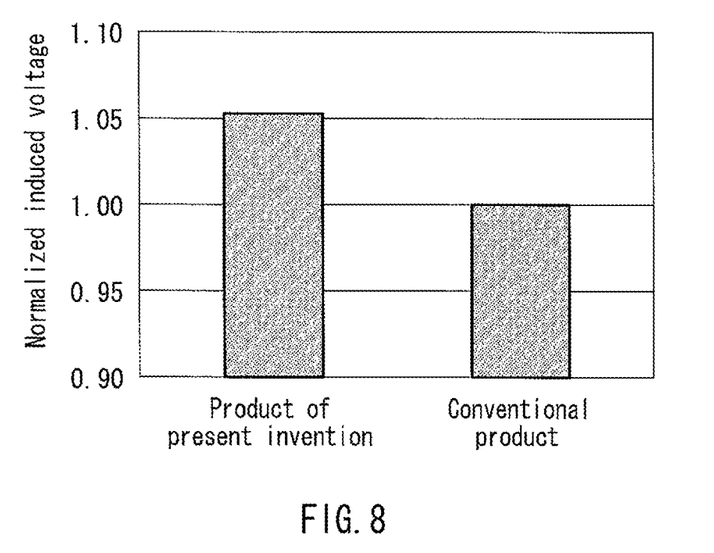
FIG. 8 is a graph comparing induced voltages of the motor according to the embodiment of the present invention and the conventional motor.

Induced voltages generated at the coils 6 when the rotors 4 were rotated by driving the driving shafts 8 of the two types of motors were measured. FIG. 8 shows the results. The vertical axis in FIG. 8 indicates a normalized induced voltage taking the induced voltage of the conventional product as 1. It was confirmed that the product of the present invention satisfying $R1i$<T1 generates a higher induced voltage than the conventional product not satisfying this inequality expression. The reason for this is that the product of the present invention has a larger amount of magnetic fluxes passing through the magnetic path 3e of the magnetic pole 3a about which the coil 6 is wound than the conventional product. Thus, it was confirmed that, according to the present invention, the driving efficiency of the motor can be improved.

Figure 9:
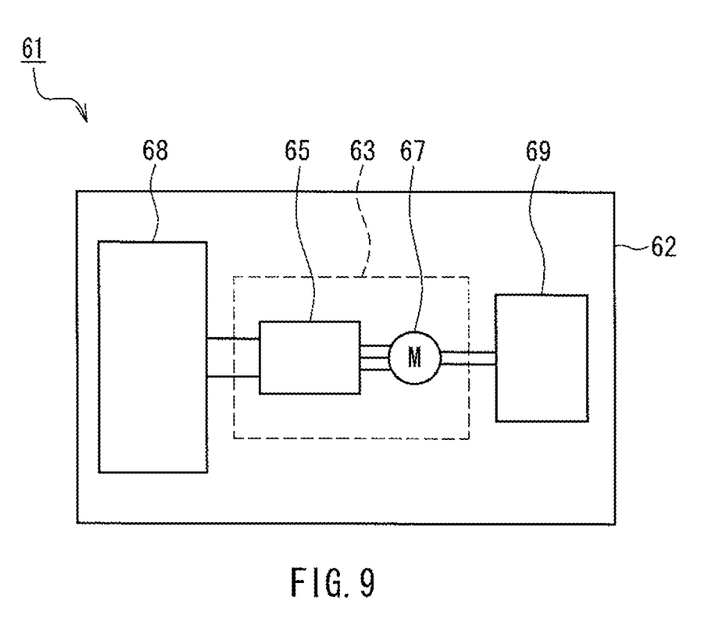
FIG. 9 is a diagram showing the schematic configuration of an example of an electronic apparatus using the motor of the present invention.

FIG. 9 is a diagram showing the schematic configuration of an example of an electronic apparatus using the motor of the present invention. In FIG. 9, an electronic apparatus 61 includes a casing 62 that functions as a main body case, a motor 67 mounted inside the casing 62, a driving unit 65 for driving the motor 67, a power source 68 for supplying electricity to the driving unit 65, and a load (driven member) 69 such as a mechanism portion that is driven using the motor 67 as a power source. Here, the motor 67 and the driving unit 65 constitute a motor drive apparatus 63. The motor 67 is driven by electrical power supplied from the power source 68 via the driving unit 65. A rotational torque is transmitted via the driving shaft of the motor 67 to the load 69. The motor 2 of the present invention can be used as the motor 67.

For example, a laser printer can be given as an example of the electronic apparatus 61. In this case, a paper feed roller corresponds to the load 69. The motor 2 of the present invention shown in FIG. 1 may be mounted together with various electronic components on the wiring board 1 that is horizontally provided in a main body case of the laser printer. In the motor 2, a gear (not shown) can be fixed to a lower portion of the driving shaft 8 that passes through the wiring board 1 and extends downward, and this gear and a gear provided at the paper feed roller can be coupled to each other via a gearbox (not shown) functioning as a deceleration mechanism. The motor 2 of the present invention has a high driving efficiency and, thus, a laser printer can be realized that can feed paper efficiently.

According to the present invention, it is possible to provide an outer rotor-type motor that has an improved driving efficiency. Thus, the present invention is preferable, for example, for a motor that is used in electronic apparatuses such as laser printers, laser copiers, and the like. Here, the motor of the present invention is not limited to these, and can be used widely as a motor that is required to have a high driving efficiency.

The embodiments described above are solely intended to elucidate the technological content of the present invention, and the present invention is not limited to or by these specific examples alone. Various modifications are possible within the spirit of the invention and the scope of the claims, and the present invention should be interpreted broadly.

What is claimed is:
1. A motor, comprising:
   a stator on whose outer circumference a plurality of magnetic poles are arranged at a first predetermined interval in a circumferential direction; and
   a rotor that is rotatably disposed around the stator;
   wherein an inner circumferential face of the rotor is provided with a magnet magnetized to have opposite polarities at a second predetermined interval in a circumferential direction, the stator is configured from a plurality of layers of plate-shaped members, each of outer circumferential ends of the plurality of magnetic poles is provided with an extended portion that is bent such that at least two plate-shaped members, including an outermost layer, of the plurality of plate-shaped members are substantially parallel to the magnet, and when an internal radius of curvature of a bent portion of a first plate-shaped member that is the closest to the magnet of the at least two plate-shaped members constituting the extended portion is taken as $R1i$, a thickness of the first plate-shaped member is taken as $T1$, and a bent portion of a second plate-shaped member adjacent to the first plate-shaped member has a convex outwardly facing surface that faces the bent portion of the first plate-shaped member, the convex outwardly facing surface having an external radius of curvature taken as $R2o$, $R1i<T1$ and $R1i<R2o$ are satisfied.

2. The motor according to claim 1, wherein, when an external radius of curvature of the bent portion of the first plate-shaped member is taken as $R1o$, $R1o<T1$ is satisfied.

3. The motor according to claim 1, wherein an internal radius of curvature of a bent portion of each of the at least two plate-shaped members is smaller than a thickness of the plate-shaped member.

4. The motor according to claim 1, wherein, when a thickness of a thinnest plate-shaped member of a plate-shaped member not constituting the extended portion is taken as $T2$, $T1>T2$ is satisfied.

5. An electronic apparatus, comprising:
a main body case;
a driven member that is provided in the main body case; and
a motor that is coupled to the driven member;
wherein the motor is the motor according to claim 1.

* * * * *